July 6, 1943.  F. J. HANSGIRG  2,323,597
PROCESS OF MANUFACTURING METALLIC MAGNESIUM
Filed July 12, 1941
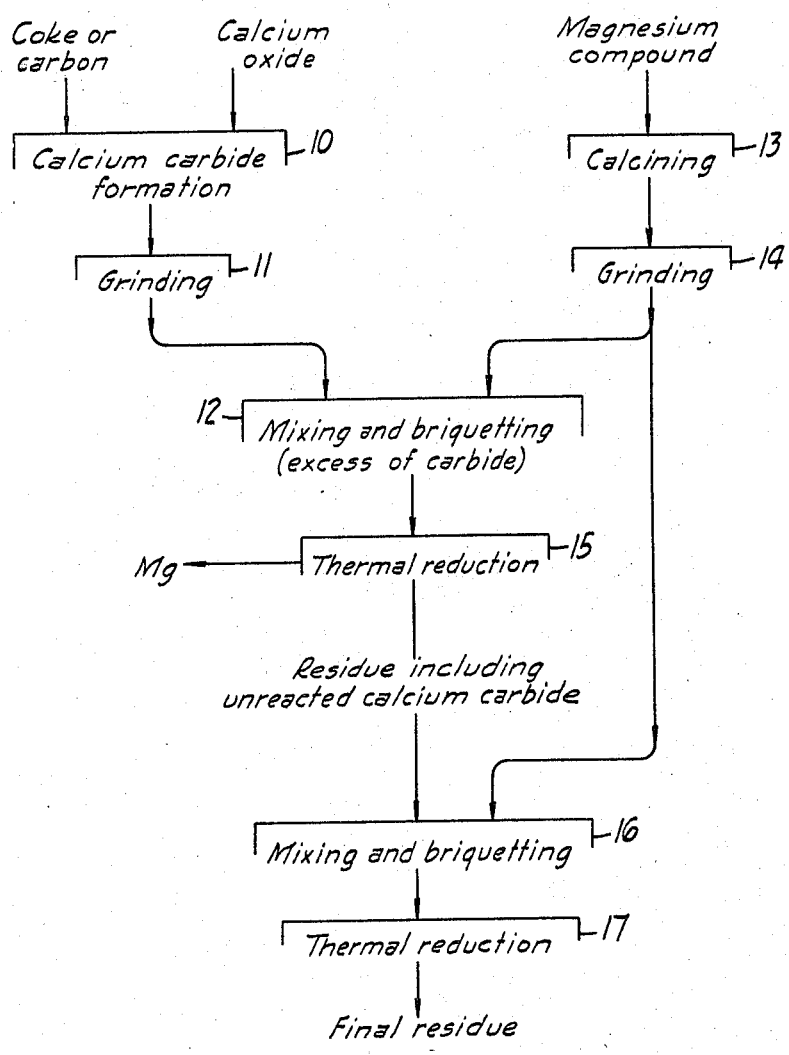
INVENTOR
Fritz J. Hansgirg
BY
ATTORNEY Patented July 6, 1943

2,323,597

UNITED STATES PATENT OFFICE 2,323,597

PROCESS OF MANUFACTURING METALLIC MAGNESIUM

Fritz J. Hansgirg, San Mateo, Calif., assignor to Marine Magnesium Products Corporation, South San Francisco, Calif., a corporation of Delaware Application July 12, 1941, Serial No. 402,160

2 Claims. (Cl. 75—67)

This invention relates generally to processes for the manufacture of metallic magnesium by thermal reduction of magnesium compounds such as magnesium oxide. More particularly, it relates to processes making use of thermal reduction of magnesium oxide with calcium carbide.

In processes of the above character, one problem is to secure a relatively high yield of metallic magnesium for the amount of calcium carbide employed. Calcium carbide is a relatively expensive reducing agent, and its wasteful utilization in the process increases the cost of production of the metal.

Aside from factors which are known to aid in securing better reaction between the ingredients, as for example the use of a relatively fine grind together with uniform admixture of the ingredients, I have discovered that the yield of magnesium with respect to the amount of calcium carbide utilized in the process can be increased by a two-stage reduction process.

Generally, mixtures used for reduction of magnesium oxide with calcium carbide employ a 1 to 1 molecular ratio, or even a slight excess of magnesium oxide. Instead of proceeding in this fashion, in an endeavor to secure a good yield in one stage, I first form a mixture between calcium carbide and magnesium oxide, utilizing a substantial excess of calcium carbide over the amount theoretically necessary for the reduction of magnesium oxide present. The residue from this reaction contains substantial amounts of unreacted calcium carbide, and end products of the reaction, including calcium oxide and carbon. This residue is then intermixed with additional amounts of magnesium oxide, and subjected to a second thermal reduction operation. In the second thermal reduction operation, the amount of calcium carbide present in the residue from the first stage can be an amount theoretically necessary to reduce the magnesium oxide. I have found that by such a second thermal reduction stage, substantially all of the calcium carbide is utilized so that the net result is a relatively high yield of metallic magnesium for the amount of calcium carbide employed.

In view of the foregoing, it is an object of the present invention to improve upon the efficiency of the reaction of calcium carbide with magnesium oxide for the manufacture of metallic magnesium, thus making possible relatively high yields of magnesium for the calcium carbide employed.

Additional objects and features of the invention will appear from the following specification, in which the preferred embodiment has been set forth in detail in conjunction with the accompanying drawing.

Referring now to the flow sheet shown in the accompanying drawing, for a better understanding of the process, I have shown calcium carbide for use in the process being manufactured in the operation 10. This requires coke or carbon and the calcium oxide, as is well known to those skilled in the art, and is carried in a suitable electrical furnace. The calcium carbide is subjected to grinding at 11, and the ground material is then supplied to the mixing and briquetting operation 12.

The magnesium oxide used in the process is obtained from some suitable source, such as precipitated magnesium hydroxide, or a natural magnesium compound, which is first subjected to the calcining operation 13 to form magnesium oxide. This calcining should be carried out at relatively high temperatures, as for example from 900 to 1,100° C., for a period of time sufficient to totally remove all water of hydration. The calcined material is then subjected to grinding at 14, and the ground material supplied to the mixing and briquetting operation 12. The proportions of calcium carbide and magnesium oxide employed in this first briquetting operation is such as to provide an excess of calcium carbide over that theoretically required to reduce the magnesium oxide. For example, a molecular ratio of 1 to 0.5 between the calcium carbide and magnesium oxide can be employed. The briquetting is carried out by suitable equipment which forms the material into small pellets or briquets by application of pressure.

The briquets formed at 12 are now employed in the thermal reduction operation 15. This operation is carried out by the use of suitable equipment such as is known to those skilled in the art. The equipment can consist of a gastight retort into which the briquets are charged, and which is heated under controlled conditions by a suitable furnace. Suitable condensing means are utilized in conjunction with the retort for condensing the evolved magnesium vapor to the form of a solid crystallized mass. It is desirable to carry out the reduction operation at temperatures such as from 1050 to 1115° C., under a vacuum such as from 0.5 to 2 mm. of mercury.

The residue from the first thermal reduction operation consists of the end products calcium oxide and carbon, together with substantial amounts of unreacted calcium carbide. Only relatively small amounts of magnesium oxide will be present. This residue is now intermixed with an additional amount of magnesium oxide from the grinding operation in the second mixing and briquetting operation 16. The proportioning at this time is such that the amount of calcium carbide is theoretically correct for reaction with the magnesium oxide. In other words, a molecular ratio of 1 to 1, or stoechiometrical proportions, are employed. These briquets are now supplied to the second thermal reduction operation 17 which can be carried out in the same equipment as operation 15, or in separate apparatus of the same character. In the second reduction operation, additional magnesium is obtained, and a final residue is obtained containing only relatively small amounts of residual unreacted calcium carbide. This residue also contains the end products calcium oxide and carbon, and varying but small amounts of magnesium oxide. This residue can be usefully employed, as for example for the purpose of precipitating magnesium hydroxide from a brine containing convertible magnesium salts, which magnesium hydroxide can be settled, washed, and utilized for the calcining operation 13. When the residue is utilized in this manner, the end product carbon is finally removed with the precipitated magnesium hydroxide, and can be burned to supply heat for the calcining operation 13. Also, unreacted magnesium oxide in the residue emerges with the precipitated magnesium hydroxide and is likewise passed to the calcining operation 13.

The process described above affords a relatively simple procedure for securing a relatively efficient yield of magnesium for the amount of calcium carbide employed. In actual practice, by the utilization of this process, I have secured yields ranging from 85% to 90%, whereas in the past, yields of about 75% have been considered to be good.

I claim:

1. In a process for the manufacture of metallic magnesium by thermal reduction of magnesium oxide with calcium carbide, the steps of intermixing the calcium carbide with magnesium oxide in proportions such that there is an excess of calcium carbide present over that theoretically required to combine with the magnesium oxide, subjecting the mixture to a reducing operation at an elevated temperature, intermixing the residue of the reducing operation with additional magnesium oxide, and then subjecting the last-named mix to a second thermal reduction operation at an elevated temperature for reduction of the additional magnesium oxide.

2. In a process for the manufacture of metallic magnesium by thermal reduction of magnesium oxide with calcium carbide, the steps of intermixing calcium carbide with magnesium oxide in proportions such that there is an excess of calcium carbide for the amount of magnesium oxide present, over stoechiometric proportions, subjecting the mixture to a reducing operation at an elevated temperature to effect evolution of magnesium vapor, with reduction of the magnesium oxide, providing a residue containing substantial amounts of calcium carbide, intermixing the residue with an additional amount of magnesium oxide, in substantially stoechiometric proportions with respect to the calcium carbide and magnesium oxide content, and then subjecting the mixture to a second thermal reduction operation for evolution of magnesium vapor.

FRITZ J. HANSGIRG.